(12) United States Patent
Milley et al.

(10) Patent No.: US 9,052,217 B2
(45) Date of Patent: Jun. 9, 2015

(54) VARIABLE SCALE SENSOR

(71) Applicant: Honeywell International Inc., Morristown, NJ (US)

(72) Inventors: Andrew J. Milley, Hilliard, OH (US); Richard C. Sorenson, Columbus, OH (US)

(73) Assignee: Honeywell International Inc., Morristown, NJ (US)

( * ) Notice: Subject to any disclaimer, the term of this patent is extended or adjusted under 35 U.S.C. 154(b) by 215 days.

(21) Appl. No.: 13/673,685

(22) Filed: Nov. 9, 2012

(65) Prior Publication Data

US 2014/0130605 A1 May 15, 2014

(51) Int. Cl.
*G01F 1/00* (2006.01)
*G01D 3/02* (2006.01)
*G01D 3/024* (2006.01)
*G01D 18/00* (2006.01)

(52) U.S. Cl.
CPC .................. *G01D 3/02* (2013.01); *G01D 3/024* (2013.01); *G01D 18/008* (2013.01)

(58) Field of Classification Search
CPC .............. G01F 1/05; G01F 1/42; G01F 1/68
USPC ........................ 73/861.79, 861, 627, 204.14
See application file for complete search history.

(56) References Cited

U.S. PATENT DOCUMENTS

| | | | |
|---|---|---|---|
| 2,746,296 A | 5/1956 | Stover | |
| 3,216,249 A | 11/1965 | Joel | |
| 3,410,287 A | 11/1968 | Van Der Heyden et al. | |
| 3,433,069 A | 3/1969 | Trageser | |
| 3,484,732 A | 12/1969 | Postma | |
| 3,559,482 A | 2/1971 | Baker et al. | |
| 3,640,277 A | 2/1972 | Adelberg | |
| 3,785,206 A | 1/1974 | Benson et al. | |

(Continued)

FOREIGN PATENT DOCUMENTS

| | | |
|---|---|---|
| DE | 3905746 | 8/1990 |
| DE | 102004019521 | 11/2005 |

(Continued)

OTHER PUBLICATIONS

"Schematic Cross-Section for AWM43600," 1 page, prior to Jan. 31, 2011.

(Continued)

*Primary Examiner* — Jewel V Thompson
(74) *Attorney, Agent, or Firm* — Seager Tufte & Wickhem LLC (57) ABSTRACT

A sensor assembly includes a sense element for sensing a sensed parameter. The sense element may provide a sense element output signal that is related to the sensed parameter. A control block may include a first input port for receiving the sense element output signal, a second input port for receiving a scale input adjustable by a user, and an output port for providing a sensor assembly output signal. The control block may be configured to take in the sense element output signal via the first input port and produce the sensor assembly output signal at the output port, wherein the sensor assembly output signal at the output port is related to the sense element output signal and corresponds to a user selected range of the sensed parameter. The user selected range may be determined, at least in part, by the scale input received via the second input port.

16 Claims, 9 Drawing Sheets (56) References Cited

U.S. PATENT DOCUMENTS

| | | |
|---|---|---|
| 3,789,658 A | 2/1974 | Olsen |
| 3,830,104 A | 8/1974 | Gau |
| 3,838,598 A | 10/1974 | Tompkins |
| 3,886,799 A | 6/1975 | Billette et al. |
| 3,895,531 A | 7/1975 | Lambert |
| 3,931,736 A | 1/1976 | Olmstead |
| 3,952,577 A | 4/1976 | Hayes et al. |
| 3,970,841 A | 7/1976 | Green |
| 3,981,074 A | 9/1976 | Yamamoto et al. |
| 4,008,619 A | 2/1977 | Alcaide et al. |
| 4,030,357 A | 6/1977 | Wemyss |
| 4,041,757 A | 8/1977 | Baker et al. |
| 4,098,133 A | 7/1978 | Frische et al. |
| 4,100,801 A | 7/1978 | LeMay |
| 4,326,214 A | 4/1982 | Trueblood |
| 4,343,194 A | 8/1982 | Dehart et al. |
| 4,411,292 A | 10/1983 | Schiller |
| 4,418,723 A | 12/1983 | Koni et al. |
| 4,444,060 A | 4/1984 | Yamamoto |
| RE31,570 E | 5/1984 | Drexel |
| 4,478,076 A | 10/1984 | Bohrer |
| 4,478,077 A | 10/1984 | Bohrer et al. |
| 4,481,828 A | 11/1984 | Cheng |
| 4,494,405 A | 1/1985 | Oosuga et al. |
| 4,501,144 A | 2/1985 | Higashi et al. |
| 4,546,655 A | 10/1985 | Victor |
| 4,574,640 A | 3/1986 | Krechmery |
| 4,581,928 A | 4/1986 | Johnson |
| 4,581,945 A | 4/1986 | Rusz |
| 4,618,397 A | 10/1986 | Shimizu et al. |
| 4,648,270 A | 3/1987 | Johnson et al. |
| 4,651,564 A | 3/1987 | Johnson et al. |
| 4,653,321 A | 3/1987 | Cunningham et al. |
| 4,655,088 A | 4/1987 | Adams |
| 4,668,102 A | 5/1987 | Mott |
| 4,672,997 A | 6/1987 | Landis et al. |
| 4,677,850 A | 7/1987 | Miura et al. |
| 4,677,858 A | 7/1987 | Ohnhaus |
| 4,683,159 A | 7/1987 | Bohrer et al. |
| 4,691,566 A | 9/1987 | Aine |
| 4,696,194 A | 9/1987 | Taylor |
| 4,768,386 A | 9/1988 | Taddeo |
| 4,790,181 A | 12/1988 | Aine |
| 4,800,754 A | 1/1989 | Korpi |
| 4,817,022 A | 3/1989 | Jornod et al. |
| 4,825,704 A | 5/1989 | Aoshima et al. |
| 4,829,818 A | 5/1989 | Bohrer |
| 4,839,038 A | 6/1989 | Mclain, II |
| 4,845,649 A | 7/1989 | Eckhardt et al. |
| 4,856,328 A | 8/1989 | Johnson |
| 4,900,242 A | 2/1990 | Maus et al. |
| 4,945,762 A | 8/1990 | Adamic, Jr. |
| 4,961,344 A | 10/1990 | Rodder |
| 4,976,283 A | 12/1990 | Wildfang et al. |
| 4,986,127 A | 1/1991 | Shimada et al. |
| 5,000,478 A | 3/1991 | Kerastas |
| 5,014,552 A | 5/1991 | Kamiunten et al. |
| 5,042,307 A | 8/1991 | Kato |
| 5,050,429 A | 9/1991 | Nishimoto et al. |
| 5,063,786 A | 11/1991 | Sanderson et al. |
| 5,063,787 A | 11/1991 | Khuzai et al. |
| 5,081,866 A | 1/1992 | Ochiai et al. |
| 5,088,329 A | 2/1992 | Sahagen |
| 5,088,332 A | 2/1992 | Merilainen et al. |
| 5,089,979 A | 2/1992 | McEachern et al. |
| 5,099,965 A | 3/1992 | Lehnert et al. |
| 5,107,441 A | 4/1992 | Decker |
| 5,137,026 A | 8/1992 | Waterson et al. |
| 5,144,843 A | 9/1992 | Tamura et al. |
| 5,155,061 A | 10/1992 | O'Connor et al. |
| 5,161,410 A | 11/1992 | Davey et al. |
| 5,187,985 A | 2/1993 | Nelson |
| 5,193,393 A | 3/1993 | Czarnocki |
| 5,220,830 A | 6/1993 | Bonne |
| 5,231,877 A | 8/1993 | Henderson |
| 5,249,462 A | 10/1993 | Bonne |
| 5,253,517 A | 10/1993 | Molin et al. |
| 5,295,394 A | 3/1994 | Suzuki |
| 5,303,584 A | 4/1994 | Ogasawara et al. |
| 5,319,973 A | 6/1994 | Crayton et al. |
| 5,321,638 A | 6/1994 | Witney |
| 5,332,005 A | 7/1994 | Baan |
| 5,341,841 A | 8/1994 | Schaefer |
| 5,341,848 A | 8/1994 | Laws |
| 5,357,793 A | 10/1994 | Jouwsma |
| 5,377,128 A | 12/1994 | McBean |
| 5,379,650 A | 1/1995 | Kofoed et al. |
| 5,385,046 A | 1/1995 | Yamakawa et al. |
| 5,398,194 A | 3/1995 | Brosh et al. |
| 5,400,973 A | 3/1995 | Cohen |
| 5,404,753 A | 4/1995 | Hecht et al. |
| 5,453,628 A | 9/1995 | Hartsell et al. |
| 5,459,351 A | 10/1995 | Bender |
| 5,460,050 A | 10/1995 | Miyano |
| 5,481,925 A | 1/1996 | Woodbury |
| 5,507,171 A | 4/1996 | Mattes et al. |
| 5,528,452 A | 6/1996 | Ko |
| 5,535,135 A | 7/1996 | Bush et al. |
| 5,535,633 A | 7/1996 | Kofoed et al. |
| 5,537,870 A | 7/1996 | Zurek et al. |
| 5,544,529 A | 8/1996 | Mitani et al. |
| 5,551,304 A | 9/1996 | Baskett |
| 5,578,962 A | 11/1996 | Rastegar |
| 5,581,027 A | 12/1996 | Juntunen |
| 5,583,295 A | 12/1996 | Nagase et al. |
| 5,585,311 A | 12/1996 | Ko |
| 5,609,303 A | 3/1997 | Cohen |
| 5,634,592 A | 6/1997 | Campau |
| 5,641,911 A | 6/1997 | Ryhanen |
| 5,672,832 A | 9/1997 | Cucci et al. |
| 5,717,145 A | 2/1998 | Yasuhara et al. |
| 5,735,267 A | 4/1998 | Tobia |
| 5,736,651 A | 4/1998 | Bowers |
| 5,741,968 A | 4/1998 | Arai |
| 5,747,705 A | 5/1998 | Herb et al. |
| 5,750,892 A | 5/1998 | Huang et al. |
| 5,763,787 A | 6/1998 | Gravel et al. |
| 5,770,883 A | 6/1998 | Mizuno et al. |
| 5,781,291 A | 7/1998 | So et al. |
| 5,789,660 A | 8/1998 | Kofoed et al. |
| 5,792,958 A | 8/1998 | Speldrich |
| 5,808,210 A | 9/1998 | Herb et al. |
| 5,817,950 A | 10/1998 | Wiklund et al. |
| 5,829,685 A | 11/1998 | Cohen |
| 5,844,135 A | 12/1998 | Brammer et al. |
| 5,861,561 A | 1/1999 | Van Cleve et al. |
| 5,866,824 A * | 2/1999 | Schieber .................. 73/861.79 |
| 5,870,482 A | 2/1999 | Loeppert et al. |
| 5,942,694 A | 8/1999 | Robins et al. |
| 6,023,978 A | 2/2000 | Dauenhauer et al. |
| 6,035,721 A | 3/2000 | Krisch |
| 6,044,716 A | 4/2000 | Yamamoto |
| 6,047,244 A | 4/2000 | Rud, Jr. |
| 6,112,598 A | 9/2000 | Tenerz et al. |
| 6,119,730 A | 9/2000 | McMillan |
| 6,128,963 A | 10/2000 | Bromster |
| 6,131,463 A | 10/2000 | Morris |
| 6,142,014 A | 11/2000 | Rilling |
| 6,150,681 A | 11/2000 | Allen |
| 6,164,143 A | 12/2000 | Evans |
| 6,167,763 B1 | 1/2001 | Tenerz et al. |
| 6,169,965 B1 | 1/2001 | Kubisiak et al. |
| 6,177,637 B1 | 1/2001 | Evans |
| 6,223,593 B1 | 5/2001 | Kubisiak et al. |
| 6,229,190 B1 | 5/2001 | Bryzek et al. |
| 6,234,016 B1 | 5/2001 | Bonne et al. |
| 6,247,495 B1 | 6/2001 | Yamamoto et al. |
| 6,263,740 B1 | 7/2001 | Sridhar et al. |
| 6,308,553 B1 | 10/2001 | Bonne et al. |
| 6,312,389 B1 | 11/2001 | Kofoed et al. |
| 6,322,247 B1 | 11/2001 | Bonne et al. |
| 6,445,053 B1 | 9/2002 | Cho |
| 6,450,005 B1 | 9/2002 | Bentley |
| 6,452,427 B1 | 9/2002 | Ko et al. |

(56) References Cited

U.S. PATENT DOCUMENTS

| | | |
|---|---|---|
| 6,502,459 B1 | 1/2003 | Bonne et al. |
| 6,526,822 B1 | 3/2003 | Maeda et al. |
| 6,527,385 B2 | 3/2003 | Koitabashi et al. |
| 6,528,340 B2 | 3/2003 | Haji-Sheikh et al. |
| 6,542,594 B1 | 4/2003 | LeBoulzec |
| 6,543,449 B1 | 4/2003 | Woodring et al. |
| 6,553,808 B2 | 4/2003 | Bonne et al. |
| 6,557,409 B2 | 5/2003 | Stescak |
| 6,561,021 B2 | 5/2003 | Uramachi et al. |
| 6,579,087 B1 | 6/2003 | Vrolijk |
| 6,591,674 B2 | 7/2003 | Gehman et al. |
| 6,615,668 B2 | 9/2003 | Toyoda et al. |
| 6,621,138 B1 | 9/2003 | Alter |
| 6,642,594 B2 | 11/2003 | Kurtz |
| 6,647,776 B2 | 11/2003 | Kohmura et al. |
| 6,653,959 B1 | 11/2003 | Song |
| 6,655,207 B1 | 12/2003 | Speldrich et al. |
| 6,681,623 B2 | 1/2004 | Bonne et al. |
| 6,684,711 B2 | 2/2004 | Wang |
| 6,715,339 B2 | 4/2004 | Bonne et al. |
| 6,724,202 B2 | 4/2004 | Tanizawa |
| 6,742,399 B2 | 6/2004 | Kunz et al. |
| 6,761,165 B2 | 7/2004 | Strickland, Jr. |
| 6,769,299 B2 | 8/2004 | Forster et al. |
| 6,779,393 B1 | 8/2004 | Muller et al. |
| 6,779,395 B2 | 8/2004 | Hornung et al. |
| 6,826,966 B1 | 12/2004 | Karbassi et al. |
| 6,871,534 B1 | 3/2005 | Hamada et al. |
| 6,871,535 B2 | 3/2005 | Blakely et al. |
| 6,871,537 B1 | 3/2005 | Gehman et al. |
| 6,886,401 B2 | 5/2005 | Ito et al. |
| 6,901,795 B2 | 6/2005 | Naguib et al. |
| 6,904,799 B2 | 6/2005 | Cohen et al. |
| 6,904,907 B2 | 6/2005 | Speldrich et al. |
| 6,907,787 B2 | 6/2005 | Cook et al. |
| 6,915,682 B2 | 7/2005 | Renninger et al. |
| 6,923,069 B1 | 8/2005 | Stewart |
| 6,928,865 B2 | 8/2005 | Ito et al. |
| 6,945,118 B2 | 9/2005 | Maitland, Jr. et al. |
| 6,957,586 B2 | 10/2005 | Sprague |
| 6,958,523 B2 | 10/2005 | Babcock et al. |
| 7,000,298 B2 | 2/2006 | Cook et al. |
| 7,000,612 B2 | 2/2006 | Jafari et al. |
| 7,024,937 B2 | 4/2006 | James |
| 7,028,560 B2 | 4/2006 | Castillon Levano |
| 7,032,463 B2 | 4/2006 | Misholi et al. |
| 7,036,366 B2 | 5/2006 | Emmert et al. |
| 7,043,978 B2 | 5/2006 | Goka et al. |
| 7,059,184 B2 | 6/2006 | Kanouda et al. |
| 7,085,628 B2 | 8/2006 | Ohmi et al. |
| 7,100,454 B2 | 9/2006 | Hasunuma |
| 7,107,834 B2 | 9/2006 | Meneghinin et al. |
| 7,117,747 B2 | 10/2006 | Borzabadi et al. |
| 7,121,139 B2 | 10/2006 | Shajii et al. |
| 7,146,860 B2 | 12/2006 | Yeh et al. |
| 7,146,864 B2 | 12/2006 | Sullivan et al. |
| 7,185,538 B2 | 3/2007 | Hager et al. |
| 7,204,139 B2 | 4/2007 | Takayama |
| 7,218,093 B2 | 5/2007 | Cirkel et al. |
| 7,239,957 B1 | 7/2007 | Sweet et al. |
| 7,243,541 B1 | 7/2007 | Bey et al. |
| 7,258,003 B2 | 8/2007 | Padmanabhan et al. |
| 7,258,016 B2 | 8/2007 | Maitland, Jr. et al. |
| 7,262,724 B2 | 8/2007 | Hughes et al. |
| 7,263,876 B2 | 9/2007 | Yamazaki et al. |
| 7,266,999 B2 | 9/2007 | Ricks |
| 7,278,309 B2 | 10/2007 | Dmytriw et al. |
| 7,278,326 B2 | 10/2007 | Kobayashi et al. |
| 7,305,877 B2 | 12/2007 | Beyrich et al. |
| 7,318,351 B2 | 1/2008 | Cobianu et al. |
| 7,337,677 B2 | 3/2008 | Mizohata |
| 7,343,812 B2 | 3/2008 | Stewart et al. |
| 7,343,823 B2 | 3/2008 | Speldrich |
| 7,347,098 B2 | 3/2008 | Kurt et al. |
| 7,347,785 B2 | 3/2008 | Worman, Jr. et al. |
| 7,353,719 B2 | 4/2008 | Hiura et al. |
| 7,373,819 B2 | 5/2008 | Engler et al. |
| 7,377,177 B1 | 5/2008 | Lamb et al. |
| 7,386,166 B2 | 6/2008 | Curry et al. |
| 7,430,918 B2 | 10/2008 | Selvan et al. |
| 7,454,984 B1 | 11/2008 | Ross et al. |
| 7,458,274 B2 | 12/2008 | Lamb et al. |
| 7,464,611 B2 | 12/2008 | Matter et al. |
| 7,469,598 B2 | 12/2008 | Shkarlet et al. |
| 7,472,580 B2 | 1/2009 | Lyons et al. |
| 7,479,255 B2 | 1/2009 | Otani et al. |
| 7,493,823 B2 | 2/2009 | Stewart et al. |
| 7,509,855 B2 | 3/2009 | Garvin |
| 7,513,149 B1 | 4/2009 | Ricks |
| 7,516,761 B2 | 4/2009 | Setescak |
| 7,520,051 B2 | 4/2009 | Becke et al. |
| 7,530,274 B2 | 5/2009 | Kurtz et al. |
| 7,549,332 B2 | 6/2009 | Yamashita et al. |
| 7,568,383 B2 | 8/2009 | Colvin et al. |
| 7,603,898 B2 | 10/2009 | Speldrich |
| 7,631,562 B1 | 12/2009 | Speldrich |
| 7,635,077 B2 | 12/2009 | Schubert |
| 7,647,835 B2 | 1/2010 | Speldrich |
| 7,653,494 B2 | 1/2010 | Neascu et al. |
| 7,654,157 B2 | 2/2010 | Speldrich |
| 7,661,303 B2 | 2/2010 | Kohno et al. |
| 7,685,874 B2 | 3/2010 | Nakano et al. |
| 7,698,938 B2 | 4/2010 | Inagaki et al. |
| 7,698,958 B2 | 4/2010 | Matter et al. |
| 7,704,774 B2 | 4/2010 | Mayer et al. |
| 7,730,793 B2 | 6/2010 | Speldrich |
| 7,757,553 B2 | 7/2010 | Meier et al. |
| 7,759,945 B2 | 7/2010 | Wade |
| 7,762,138 B2 | 7/2010 | Zdeblick et al. |
| 7,769,557 B2 | 8/2010 | Bey et al. |
| 7,775,105 B2 | 8/2010 | Khadikar et al. |
| 7,793,410 B2 | 9/2010 | Padmanabhan et al. |
| 7,805,986 B2 | 10/2010 | Colvin et al. |
| 7,823,456 B2 | 11/2010 | Krog et al. |
| 7,832,269 B2 | 11/2010 | Bey, Jr. et al. |
| 7,878,980 B2 | 2/2011 | Ricciardelli |
| 7,891,238 B2 | 2/2011 | Becke et al. |
| 7,892,488 B2 | 2/2011 | Speldrich et al. |
| 7,918,136 B2 | 4/2011 | Muchow et al. |
| 7,924,189 B2 | 4/2011 | Sayers |
| 7,950,286 B2 | 5/2011 | Bentley |
| 7,995,124 B2 | 8/2011 | Dai |
| 8,010,322 B2 | 8/2011 | Dmytriw et al. |
| 8,024,146 B2 | 9/2011 | Bey et al. |
| 8,113,046 B2 | 2/2012 | Speldrich et al. |
| 8,158,438 B2 | 4/2012 | Leiner et al. |
| 8,175,835 B2 | 5/2012 | Dmytriw et al. |
| 8,397,586 B2 | 3/2013 | Sorenson et al. |
| 8,418,549 B2 | 4/2013 | Speldrich et al. |
| 2002/0078744 A1 | 6/2002 | Gehman et al. |
| 2003/0062045 A1 | 4/2003 | Woodring et al. |
| 2003/0221491 A1 | 12/2003 | Albert et al. |
| 2004/0118200 A1 | 6/2004 | Hornung et al. |
| 2004/0163461 A1 | 8/2004 | Ito et al. |
| 2004/0177703 A1 | 9/2004 | Schumacher et al. |
| 2005/0016534 A1 | 1/2005 | Ost |
| 2005/0039809 A1 | 2/2005 | Speldrich |
| 2005/0235757 A1 | 10/2005 | De Jonge et al. |
| 2005/0247106 A1 | 11/2005 | Speldrich et al. |
| 2005/0247107 A1 | 11/2005 | Speldrich et al. |
| 2006/0017207 A1 | 1/2006 | Bechtold et al. |
| 2006/0201247 A1 | 9/2006 | Speldrich et al. |
| 2006/0225488 A1 | 10/2006 | Speldrich |
| 2007/0000330 A1 | 1/2007 | Tysoe et al. |
| 2007/0084288 A1* | 4/2007 | Thomas .................. 73/627 |
| 2007/0171589 A1 | 7/2007 | Otake |
| 2007/0176010 A1 | 8/2007 | Figi et al. |
| 2007/0197922 A1 | 8/2007 | Bradley et al. |
| 2007/0238215 A1 | 10/2007 | Stewart et al. |
| 2007/0295068 A1 | 12/2007 | Kozawa et al. |
| 2008/0163683 A1 | 7/2008 | Becke et al. |
| 2008/0202929 A1 | 8/2008 | Chapples et al. |
| 2008/0255787 A1 | 10/2008 | Sullivan et al. |
| 2009/0067684 A1 | 3/2009 | Mainguet |

(56) References Cited

U.S. PATENT DOCUMENTS

| | | | |
|---|---|---|---|
| 2009/0188303 A1 | 7/2009 | Ooishi | |
| 2009/0265144 A1 | 10/2009 | Speldrich | |
| 2010/0013165 A1 | 1/2010 | Speldrich et al. | |
| 2010/0101332 A1 | 4/2010 | Speldrich | |
| 2010/0154559 A1 | 6/2010 | Speldrich | |
| 2010/0269583 A1 | 10/2010 | Jasnie | |
| 2010/0305465 A1* | 12/2010 | Ricks et al. | 600/538 |
| 2011/0179879 A1 | 7/2011 | Bentley | |
| 2011/0226053 A1 | 9/2011 | Sorenson et al. | |
| 2011/0247411 A1 | 10/2011 | Speldrich | |
| 2012/0035866 A1 | 2/2012 | Qasimi et al. | |
| 2012/0125114 A1 | 5/2012 | Stewart et al. | |
| 2012/0186336 A1 | 7/2012 | Speldrich | |
| 2012/0192643 A1 | 8/2012 | Speldrich | |

FOREIGN PATENT DOCUMENTS

| | | |
|---|---|---|
| EP | 0094497 | 11/1983 |
| EP | 0255056 | 2/1988 |
| EP | 0559306 | 9/1993 |
| EP | 0857957 | 8/1998 |
| EP | 1655123 | 5/2006 |
| EP | 1691175 | 8/2006 |
| EP | 1959242 | 8/2008 |
| EP | 2068129 | 10/2009 |
| EP | 2157411 | 2/2010 |
| EP | 2199758 | 6/2010 |
| EP | 2270441 | 1/2011 |
| FR | 377743 | 3/1907 |
| GB | 2123564 | 2/1984 |
| JP | 49120131 | 11/1974 |
| JP | 57033311 | 2/1982 |
| JP | 57115873 | 7/1982 |
| JP | 58221119 | 12/1983 |
| JP | 63065679 | 3/1988 |
| JP | 63215929 | 9/1988 |
| JP | 3099230 | 4/1991 |
| JP | 4069521 | 3/1992 |
| JP | 7083713 | 3/1995 |
| JP | 10239130 | 9/1998 |
| JP | 10307047 | 11/1998 |
| JP | 2004012406 | 1/2004 |
| JP | 2004304052 | 10/2004 |
| JP | 2006197538 | 7/2006 |
| WO | 9221940 | 12/1992 |
| WO | 9315373 | 8/1993 |
| WO | 9517651 | 6/1995 |
| WO | 0111322 | 2/2001 |
| WO | 0161282 | 8/2001 |
| WO | 0198736 | 12/2001 |
| WO | 2006131531 | 12/2006 |
| WO | 2007095528 | 8/2007 |
| WO | 2007137978 | 12/2007 |
| WO | 2008070603 | 6/2008 |

OTHER PUBLICATIONS

Bodycote, "Competitive Teardown Analysis of Sensirion EMI," Bodycote Testing Group, 24 pages, Oct. 15, 2007.
Bodycote, "Honeywell Sensing and Control, Sensiron SDP610 Competitive Teardown Analysis," 15 pages, Feb. 19, 2009.
Honeywell, "Airflow Sensors Line Guide," 6 pages, Apr. 2010.
Honeywell, "Airflow Sensors Line Guide," 6 pages, Nov. 2010.
Honeywell, "Airflow, Force and Pressure Sensors," Product Range Guide, 20 pages, Mar. 2011.
Honeywell, "Airflow, Force, and Pressure Sensors," Product Range Guide, 20 pages, Apr. 2010.
Honeywell, "AWM43600V, Issue No. 4," 1 page, Jul. 29, 1996.
Honeywell, "AWM43600V, Part No. SS12177," 1 page, Jul. 10, 1998.
Honeywell, "Housing, Flowtube, Drawing 50005182," 1 page, Sep. 2, 2004.
Honeywell, "Housing, Plastic, Drawing 050.1.156," 1 page, Jul. 8, 1998.
Honeywell, "Housing, Subassembly, Drawing SS-12148," 1 page, Oct. 14, 1998.
Honeywell, "Mass Airflow Sensors, AWM720P1 Airflow," 4 pages, prior to Mar. 22, 2010.
Honeywell, "Mass Airflow Sensors, AWM9000 Airflow," 6 pages, 2003.
Honeywell, "Reference and Application Data, Microbridge Airflow Sensors," 1 page, prior to Mar. 22, 2010.
Honeywell, "Sensing and Control Interactive Catalog," 4 pages, prior to Mar. 22, 2010.
Honeywell, "Tubing, Plastic, Drawing SS-12062," 1 page, Apr. 5, 1999.
Honeywell, "Tubing, Plastic, Drawing SS-12160," 1 page, drawn Jan. 28, 1998.
All Sensors, "BDS Series Pressure Sensor," 4 pages, prior to Sep. 6, 2011.
Bitko et al., "Improving the MEMS Pressure Sensor," Sensors, pp. 1-12, Jul. 2000.
Celerity, Inc., "Dual Range Transducer Display," 2 pages, 2006.
Search Report for EP Application Serial No. 09178993.3 dated Dec. 16, 2011.
Search Report for EP Application Serial No. 11190426.4 dated Aug. 5, 2012.
Search Report for EP Application Serial No. 12153191.7 dated Jun. 6, 2012.
Search Report for GB Application Serial No. 1103997.1, date of search Jul. 11, 2011.
U.S. Appl. No. 13/863,188, filed Apr. 15, 2013.
Honeywell, "DCXL-DS Series, SURSENSE Ultra Low Silicon Pressure Sensors," 4 pages, May 2010.
Martel Electronics, "PPC-3300 Precision Dual Range Pressure Calibrator," 2 pages, 2002.
Schultz, "Interfacing Semiconductor Pressure Sensors to Microcomputers," Freescale Semiconductor, AN1318 Rev 2, 12 pages, May 2005.
Silicon Microstructures Inc., "Low Pressure Transducer Fully Temperature Compensated and Calibrated Dual In-Line Package," SM5651-SM5652 Low Pressure Constant Current/Voltage Dip, 2 pages, 2001-2002.
Zentrum Mikroelektronik Dresden AG, "ZMD31050/ZMD31150 Advanced Sensor Signal Conditioner," Application Notes, Electronic Offset Compensation, Rev. 1.01, 4 pages, Apr. 13, 2010.
Zentrum Mikroelektronik Dresden AG, "ZSC31050 Advanced Differential Sensor Signal Conditioner," Functional Description, Rev. 1.08, 50 pages, Jul. 29, 2010.
Search Report for Corresponding, Application No. 13190334.6, dated Feb. 25, 2014.

* cited by examiner

VARIABLE SCALE SENSOR

FIELD

The present disclosure relates generally to sensors, and more particularly, to methods and devices for adjusting the scale of such sensors.

BACKGROUND

Sensors are commonly used to sense various parameters in a wide variety of applications including, for example, medical applications, flight control applications, industrial process applications, combustion control applications, weather monitoring applications, as well as many other applications. In some applications, it may be desirable to adjust the scale of a sensor in order to match the sensor output to an expected range in a sensed parameter.

SUMMARY

This disclosure relates generally to sensors, and more particularly, to methods and devices for adjusting the scale of such sensors. Although sensor assemblies are known to exist, there is need for improvement to such sensor assemblies.

In one illustrative embodiment, a sensor assembly may include a sense element for sensing a sensed parameter. The sense element may provide a sense element output signal that is related to the sensed parameter. A control block may include a first input port for receiving the sense element output signal, a second input port for receiving a scale input adjustable by a user, and an output port for providing a sensor assembly output signal. The control block may be configured to take in the sense element output signal via the first input port and produce the sensor assembly output signal at the output port, wherein the sensor assembly output signal at the output port is related to the sense element output signal and corresponds to a user selected range of the sensed parameter. The user selected range may be determined, at least in part, by the scale input received via the second input port.

In another illustrative embodiment, a flow sensor assembly may include a housing, a flow sense element supported in the housing for sensing a flow rate, and a control block supported in the housing. The control block may provide a flow sensor assembly output signal that is related to the flow rate sensed by the flow sense element, and the control block may adjust a scale of the flow sensor assembly output signal to correspond to a user selected range of the sensed flow rate. The user selected range may be determined, at least in part, by a range input value that is user-adjustable.

In some instances, a method may be used to sense a parameter with a sense element, and output a signal that may be related to the sensed parameter. An input may be received that corresponds to a user selected monitoring range of the sensed parameter. A sensor output signal may be output, where the sensor output signal may be related to the sensed parameter and may correspond to the user selected monitoring range of the sensed parameter.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

While the disclosure is amenable to various modifications and alternative forms, specifics thereof have been shown by way of example in the drawings and will be described in detail. It should be understood, however, that the intention is not to limit the disclosure to the particular illustrative embodiments described herein. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several examples that are meant to be illustrative of the claimed disclosure.

Figure 1:
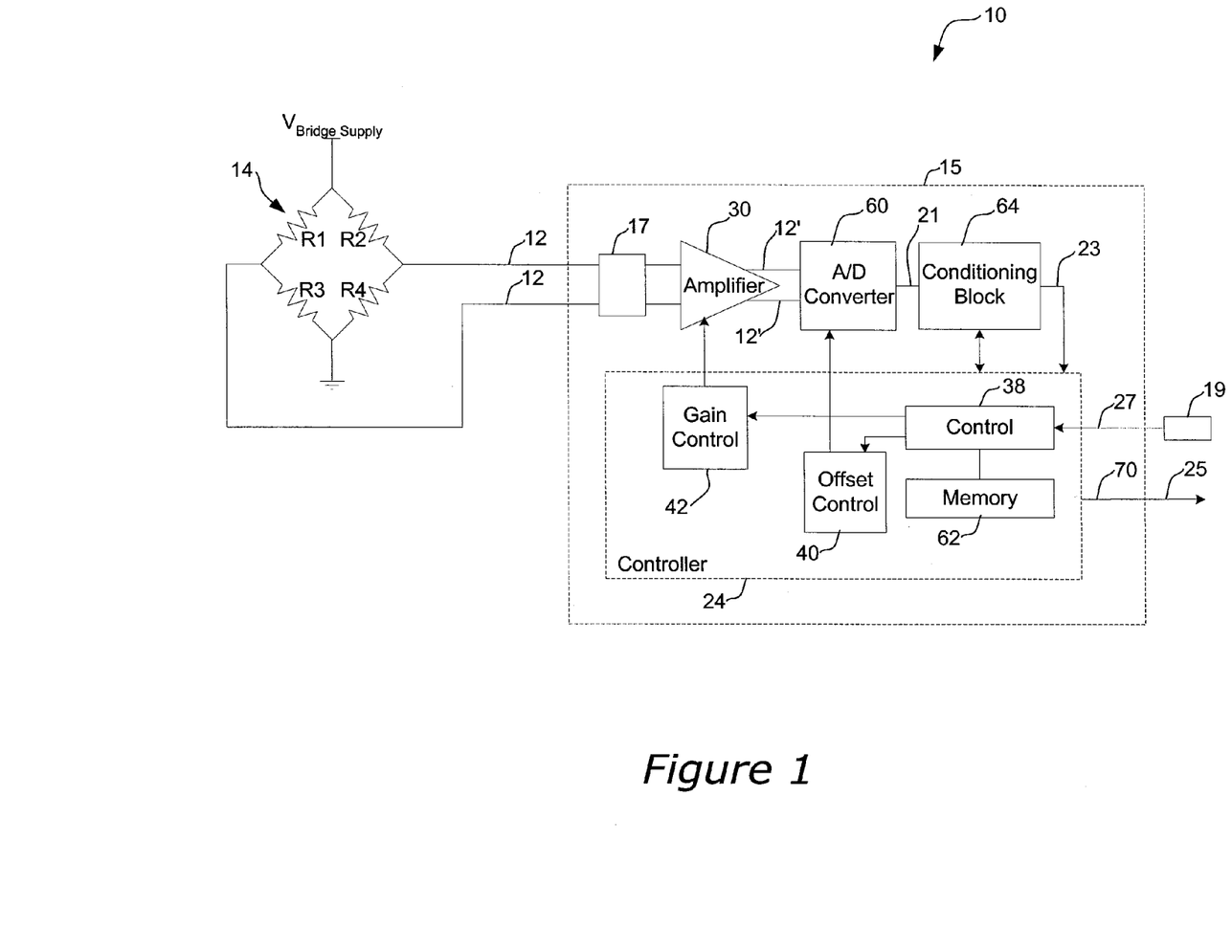
FIG. 1 is a schematic block diagram of an illustrative sensing apparatus having a scale input port to adjust the scale of the sensor.

FIG. 1 is a schematic block diagram of an illustrative flow sensing apparatus 10. The illustrative flow sensing apparatus includes a sensor 14 that produces an analog sensor output signal 12. In the example shown, the sensor 14 may be any suitable sensor, such as a pressure sensor, a flow sensor, a magnetic proximity sensor, an accelerometer, a gyro or any other suitable sensor. The illustrative sensor 14 of FIG. 1 includes four sense resistors R1-R4 connected in a full Wheatstone bridge configuration, which provides a differential analog sensor output signal 12. This, however, is just one example sensor configuration, and it is contemplated that any suitable sensor type and/or sensor configuration may be used, as desired. Also, it is contemplated that the sensor 14 may produce a differential or single ended analog sensor output signal, as desired.

In the illustrative sensing apparatus 10 of FIG. 1, the analog sensor output signal 12 may be provided to a sensor input port 17 of a control block 15. The analog sensor output signal 12 is shown provided to an amplifier 30. The gain of the amplifier 30 may be controlled in any number of ways. For example, the gain of the amplifier 30 may be controlled by a gain control block 42 of a controller 24 of control block 15. It is contemplated that the amplifier 30 may allow the gain control block 42 to vary the gain along a range of gain values, or may only allow discrete gain settings. In some cases, it is contemplated that the gain of the amplifier 30 may be electronically controlled by issuing commands to the controller 24 from a microcontroller (not shown) or the like, or may be controlled manually by user.

In some instances, the output of the amplifier 30 may be passed to an Analog-to-Digital (A/D) Converter 60, but this is not required. When provided, the A/D converter 60 may convert the amplified analog sensor output signal 12' produced by the amplifier 30 into a digital sensor output signal 21. In some cases, the A/D converter 60 may have an offset control, which can be controlled by offset control block 40 of controller 24, but this is not necessary. The digital sensor output signal 21 produced by the A/D converter may be stored in a memory, such as memory 62, if desired.

In some cases, a conditioning block 64 may be provided to condition the digital sensor output signal 21 before storing the digital sensor output signal into memory. The conditioning block 64 may, for example, help compensate for non-linearity or other non-desirable properties in the digital sensor output signal 21, and provide a conditioned digital sensor output signal 23. In some cases, the conditioning block 64 may receive one or more conditioning coefficients from a memory, such as memory 62 of controller 24, but this is not required. In some instances, the controller 24 may receive a conditioned digital sensor output signal 23 from the conditioning block 64 and store the result in memory 62. The controller 24 may then produce a sensor assembly output signal 25 on output terminal 70. In some cases, a control block 38 of controller 24 may read program instructions from a memory, such as memory 62, and may execute the program instructions to control the gain control block 42, offset control block 40 and/or conditioning block 64, as desired. The control block 15 may then output a sensor assembly output signal 25 on output terminal 70.

The control block 15 may also include a sensor scale input port 19, which may be used by a user to adjust the scale of the sensing apparatus 10. In the illustrative embodiment of FIG. 1, the sensor scale input port 19 may be connected to the control block 38 of the controller 24 and may deliver a sensor scale input signal 27. The controller 24 may read the sensor scale input signal 27, and may control the gain control block 42, offset control block 40 and/or conditioning block 64 (when provided), to adjust the scale of the sensing apparatus 10. In some cases, the scale may be adjusted so that the range of the sensor assembly output signal 25 corresponds to a desired range of the parameter sensed by the sensor 14, which may help increase the resolution in desired range of the parameter sensed by the sensor 14.

As discussed, the scale of the sensing apparatus 10 may be adjusted by adjusting the sensor scale input signal 27 received at the sensor scale input port 19. In some cases, the sensor scale input port 19 may be operatively connected to a microcontroller, ASIC, resistors (e.g., manufactured supplied or user supplied resistors), adjustable potentiometers (e.g., manually or digitally adjustable), or any other device, such that a user may manually or digitally adjust the scale of the sensing apparatus. In some instances, the amplifier 30 (e.g., an instrumentation amplifier) may have a programmable (e.g., manufacturer programmable or user programmable) gain setting, a programmable offset setting, etc., where adjusting these programmable features may adjust or modify the scale of the sensing apparatus 10. Adjusting the sensor scale input signal 27 of the control block 15 may adjust the scale of the sensing apparatus 10 via adjustment of the gain and offset of the amplifier 30 (e.g., through the gain control block 42 and the offset control block 40).

In some cases, the control block 15 may be configured to take in the sense element output signal 12 via the sensor input port 17 and produce a sensor assembly output signal 25 at the output port or terminal 70. In some cases, the sensor assembly output signal 25 at the output port or terminal 70 may be related to the sense element output signal 12, and may correspond to a user selected monitoring range of the sensed parameter by sensor 14. The user selected range may be determined, at least in part, based on the scale input received via the sensor scale input port 19 that may be user-adjustable. In some cases, using such a control block 15 may allow a user to manually adjust the scale of the sensing apparatus 10 post-production (e.g. in the field) to meet the needs of a user's system. Allowing a user to adjust the scale of the sensing apparatus 10, sometimes on the fly, may allow the user to customize the scale and thus enhance the resolution of the sensing apparatus 10 in any number of different applications (e.g., flow ranges, pressure ranges, etc.).

In some instances, the control block 15 may be configured to produce substantially the same flow sensor assembly output signal(s) 25 even at different scale settings (e.g., ranges of mass flow or flow rates), as manually or digitally adjusted by a user by adjusting the scale, to allow for an accurate and repeatable sensor. In some cases, an analog sensor assembly output signal 12' may be converted to a digital sensor output signal 21 with the analog-to-digital convertor 60 (A/D converter 60), and then the control block 15 may perform digital math on the digital sensor output signal 21 to produce substantially the same flow sensor assembly output signal(s) 23 at different range settings. In some cases, application of digital math and/or A/D conversion to the sensor output signal 12' may help with field replacement of a sensor without requiring user-side calibration.

In some cases, the control block 15 (e.g., the control block 38 of controller 24 and conditioning block 64) may be configured to calibrate the sensor assembly output signal 25 such that a value of the sensor assembly output signal 25 outputted at the output terminal 70 is within a threshold value of an expected value of the sensor assembly output signal 25 for a particularly sensed parameter, regardless of the user-selected sensed parameter scale for the sensor 14. For example, the sensor assembly output signal 25 may be calibrated (e.g., through automatic calibration or manually triggered calibration) with the control block 38 to be within a threshold value of one percent, two percent, three percent, four percent, five percent, ten percent, etc. of the expected value of the sensor assembly output signal 25 for a particularly sensed parameter, regardless of a selected scale set by the user via the sensor scale input port 19. In some instances, the sensing apparatus 10 may be configured for field replacement without any user-side calibration required due to calibration within the sensing apparatus 10, but this is not required or even desired in some cases.

In some instances, the control block 15 may include memory 62 in the controller 24. The memory 62 may be configured to store, among other things, one or more calibration parameters (e.g., the digital math, etc.). Illustratively, the digital math may be applied by the control block 15 to the digital sensor output signal 21. When applying the digital math to the digital sensor output signal 21, different sub-sets of calibration parameters, which may be stored by the memory 62, may be used for a first scale setting (e.g., an analog sensor output signal amplified by a gain of one) than are used for a second scale setting (e.g. an analog sensor output signal amplified by a gain of five).

Figure 2:
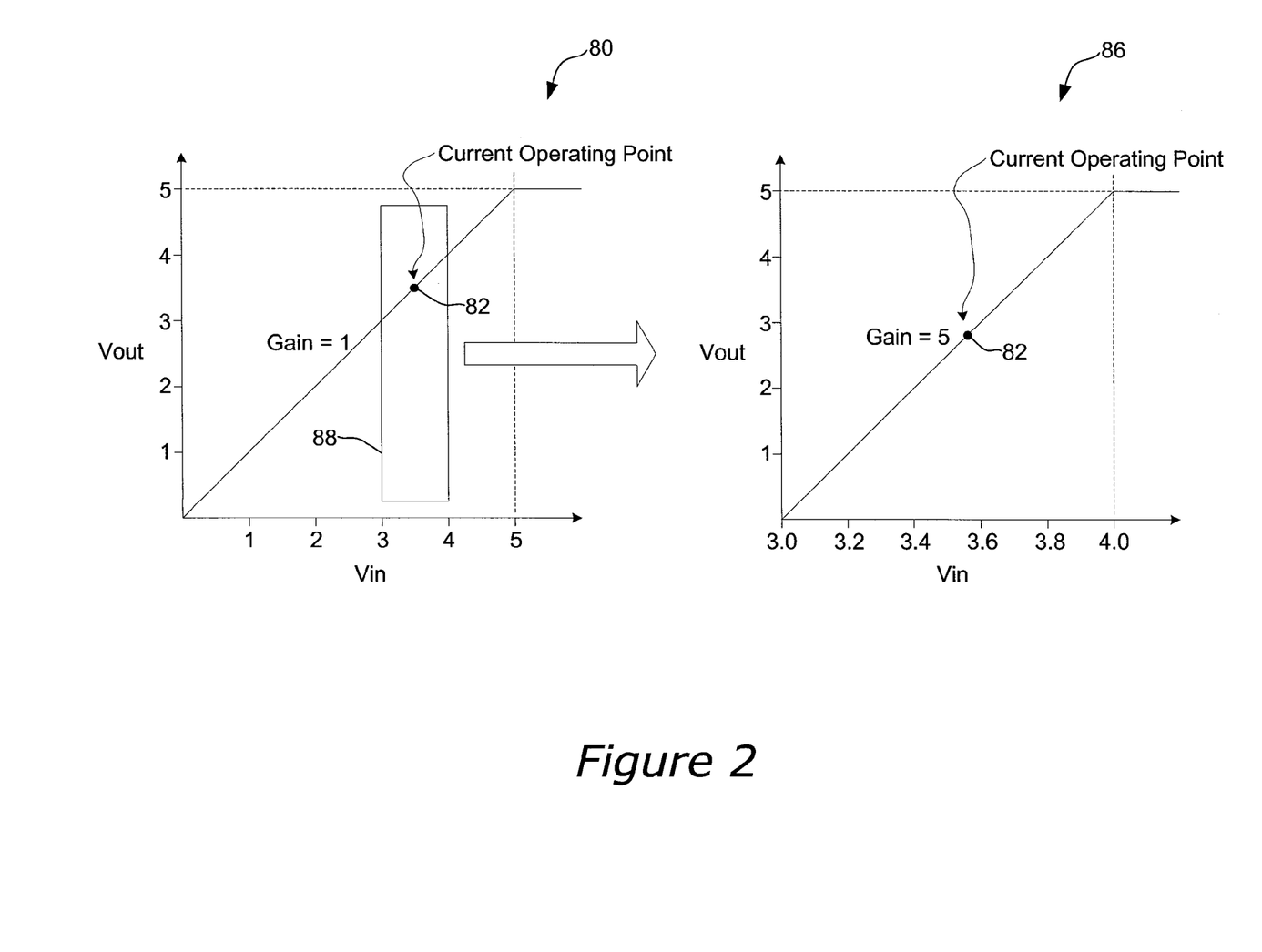
FIG. 2 shows the effect of changing the scale of the sensing apparatus of FIG. 1.

FIG. 2 shows the effect of changing the scale of the sensing apparatus of FIG. 1. As shown in FIG. 2, the sensing apparatus 10 may be capable of sensing a full range of a parameter sensed by sensor 14. In the example shown, the full range includes a sensor output signal 12 (Vin) ranging from 0 to 5 volts, resulting in an amplified sensor output 12' (Vout) ranging from 0 to 5 volts, reflecting an amplifier gain of one. If, for a given application, the current operating point of the sensing apparatus 10 is at point 82, and the expected range in the sensed parameter corresponds to range 88, then the user may adjust the sensor scale input signal 27 to scale the sensor assembly output signal 25 across only the desired range 88. This may be accomplished by adjusting the gain of the amplifier 30 to, for example, a gain of 5.0. Also the offset of the amplifier 30 may be adjusted so that the current operating point 82 is centered in the Vout range as shown. Because the full range of the amplified output (0-5V) is now focused across a sub-range (e.g. 3.0-4.0V) of the sensor output signal 12, the resolution of the sensing apparatus 10 may be increased across the desired range 88. As shown in the example of FIG. 2, this higher resolution may reveal that the current operating point 82 is at about 3.55 Volts, rather than 3.5 Volts as might be indicated before scaling the sensor apparatus. While a gain of five (5) is used as an example, it is contemplated that any suitable gain value may be used (e.g. 2-200) to achieve the desired scale. A high gain value will generally result in a narrower sub-range 88. In some cases, the A/D converter 60 may convert the higher resolution amplified analog sensor output signal 12' to a higher resolution digital sensor output signal 21, and the controller 24 may store the higher resolution digital sensor output signal 21 to the memory 62.

Figure 3:
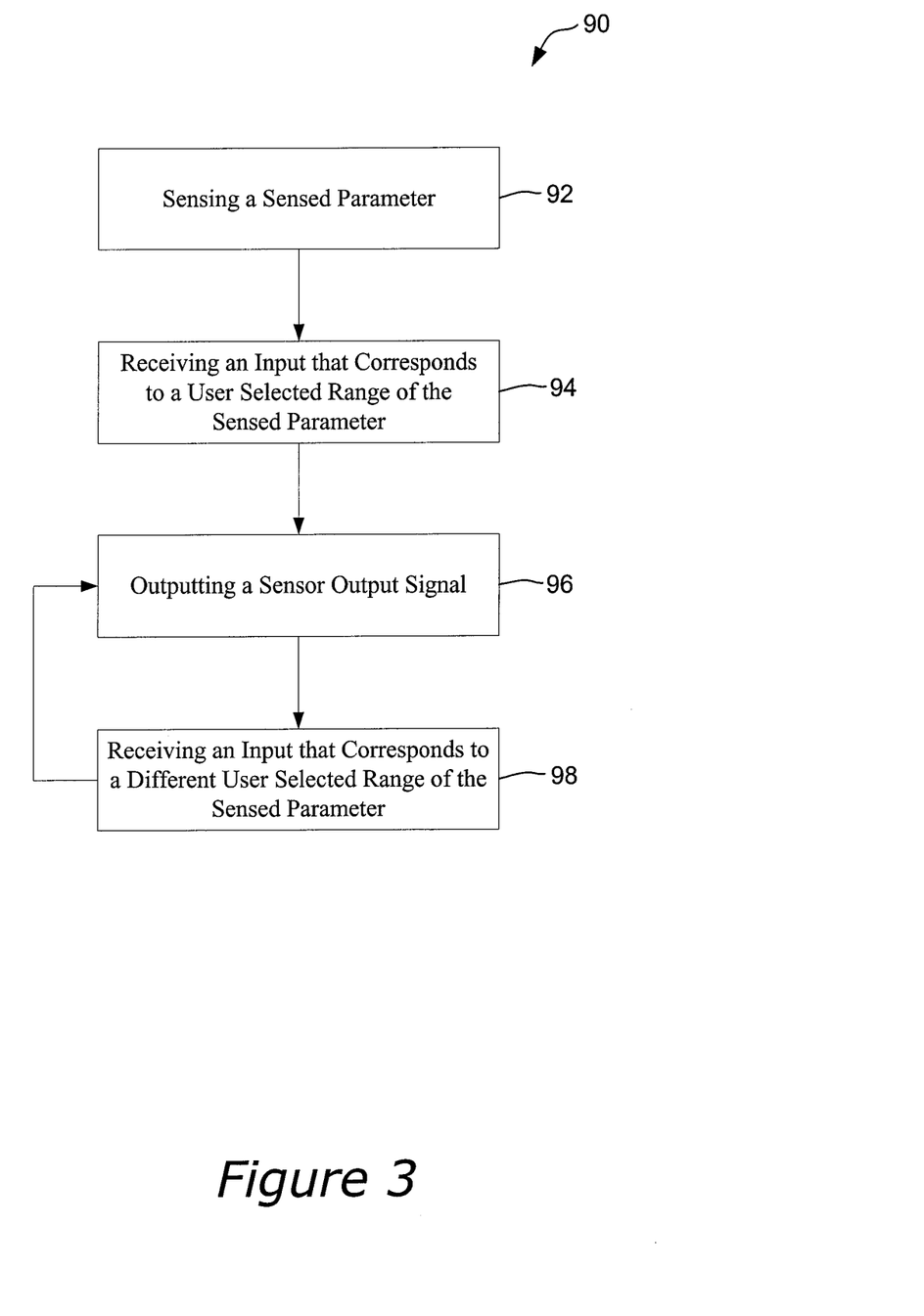
FIG. 3 is a flow diagram showing an illustrative method.

In operation, as shown in FIG. 3, the sensing apparatus 10 may be used in an illustrative method 90 that includes using the sensing apparatus 10 to sense a parameter (e.g., a pressure, a flow rate, an acceleration, an orientation, etc.) (step 92), receiving a sensor scale input signal 27 that corresponds to a user selected range of the sensed parameter (step 94), and outputting a sensor output signal 21 (step 96). In some cases, the sensor output signal 21 may be related to the sensed parameter and may correspond to the user selected range of the sensed parameter. In some cases, the sensing apparatus 10 may receive a sensor scale input signal 27 that corresponds to a different user selected range of the sensed parameter (step 98), wherein the sensing apparatus 10 may output a sensor output signal 21 that may be related to the sensed parameter and corresponds to the different user selected range of the sensed parameter. In some instances, the sensor scale input signal 27 that corresponds to the user selected range of the sensed parameter may result from manipulation (e.g., manual manipulation or automatic/digital manipulation) of an input device (e.g., microcontroller, ASIC, potentiometer, resisters, or any other device configured to adjust the scale of the sensing apparatus). Additionally or alternatively, the method 90 may be used to provide an analog-only sensor output signal 12' (e.g. without A/D converter 60 and/or Conditioning block 64)), a digital only output signal 21 (e.g., with A/D converter 60)), and/or a conditioned digital sensor output signal 23, as desired.

Figure 4:
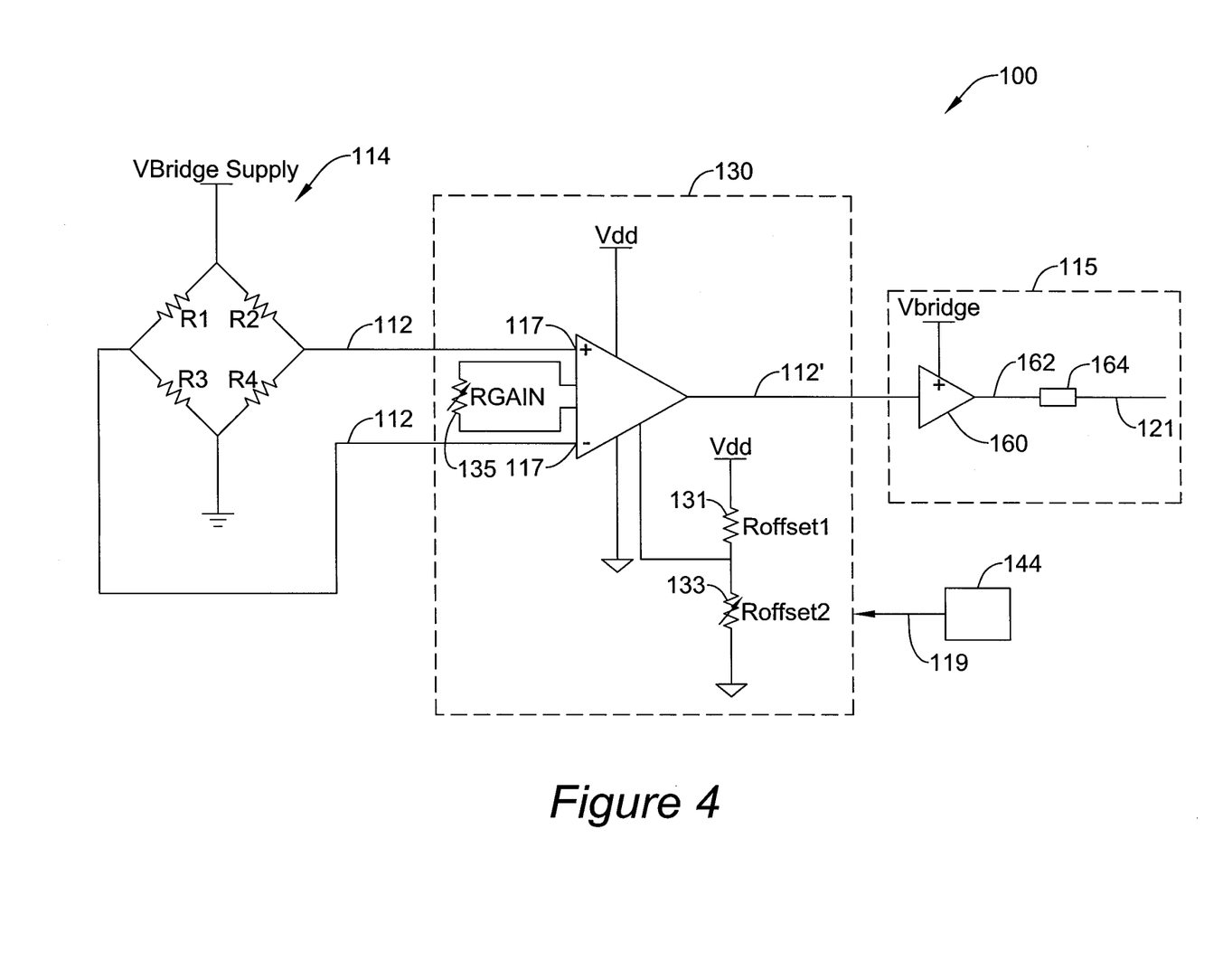
FIG. 4 is a schematic block diagram of another illustrative sensing apparatus.

FIG. 4 is a schematic block diagram of another illustrative sensing apparatus 100. In the example shown, the sensor 114 may be any suitable sensor, such as a pressure sensor, a flow sensor, a magnetic proximity sensor, an accelerometer, a gyro or any other suitable sensor. In FIG. 4, the illustrative sensor 114 includes four sense resistors R1-R4 connected in a full Wheatstone bridge configuration, which provides a differential analog sensor output signal 112. Such a sensor 114, however, is just one example, and it is contemplated that any suitable sensor type and/or sensor configuration may be used,
as desired. Also, it is contemplated that the sensor 114 may produce a differential or single ended analog sensor output signal, as desired.

In the illustrative sensing apparatus 100, the analog sensor output signal 112 may be provided to an amplifier 130 that has an adjustable gain and offset. The gain and/or offset of the amplifier 130 may be adjusted in any number of ways. For example, the gain of the amplifier 130 may be adjusted by setting the value of resistor Rgain 135, and the offset of the amplifier 130 may be adjusted by setting the values of resistors Roffset1 131 and/or Roffset2 133. In some cases, after the user determines a desired range of the sensing apparatus 100 for a particular application, the user may install resistors Rgain 135, Roffset1 131 and/or Roffset2 133 that have values that set the gain and/or offset of the amplifier 130 to produce a desired sensor scale. In some cases, one or more of the resistors Rgain 135, Roffset1 131 and/or Roffset2 133 may be adjustable potentiometers (pots) that can be adjusted manually by the user to adjust the scale of the sensing apparatus 100. In some instances, one or more of the resistors Rgain 135, Roffset1 131 and/or Roffset2 133 may be adjustable digital pots that can be adjusted electronically, such as via a command from a microcontroller or the like. When so provided, a microcontroller 144 may provide a sensor scale input 119 to adjust the digital pots to produce a desired sensor scale. When included, the microcontroller 144 may be configured to provide signals that control the gain and/or offset of the amplifier 130 in response to user adjustments of the scale of sensing apparatus and/or in response to other inputs.

In some instances, the amplified analog sensor output signal 112 may be provided to an A/D Conversion block 115, but this is not required. The A/D Conversion block 115 may include an A/D converter 160 and optionally a Signal Conditioning block 164. The A/D Conversion block 115 may be configured to convert the amplified analog sensor output signal 112 to a digital signal, and optionally to apply digital math to the digital signal to provide a conditioned (e.g., calibrated, etc.) digital output signal 121, as desired.

Figure 5:
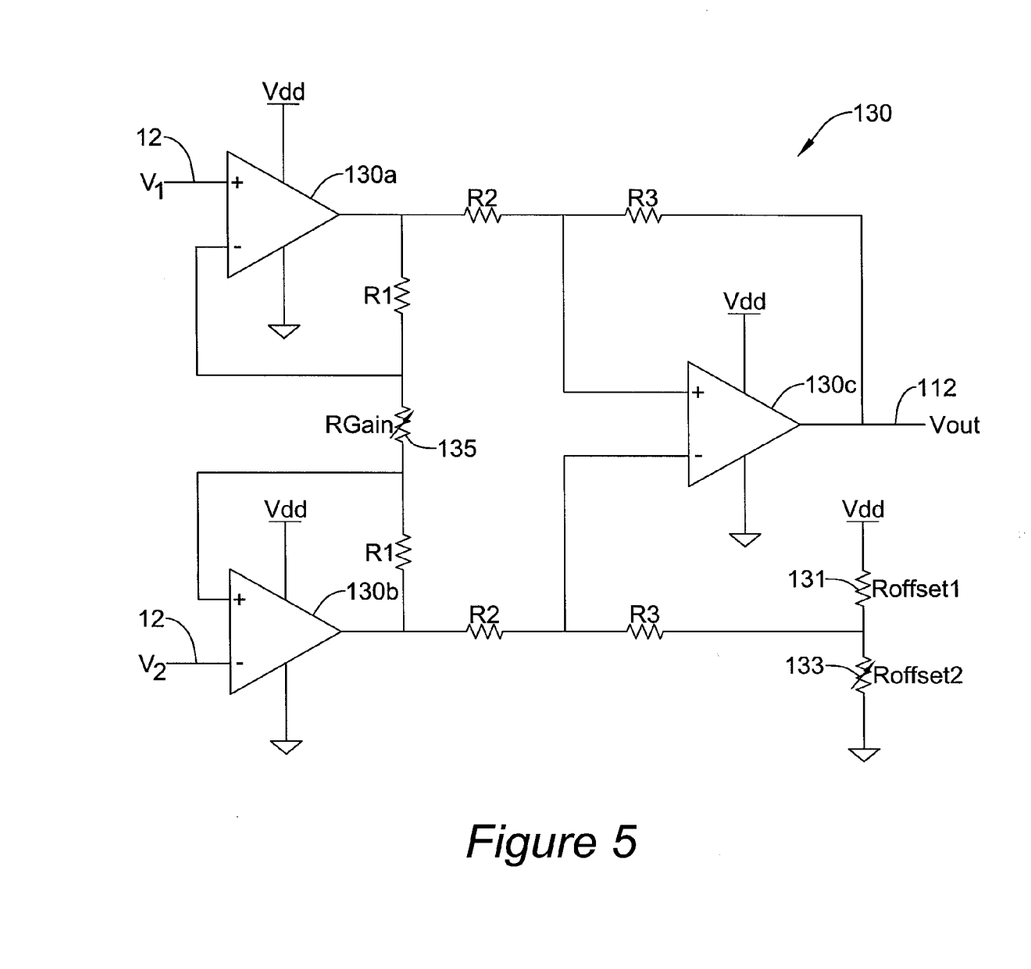
FIG. 5 is a schematic block diagram of an illustrative instrumentation amplifier that may be used with the sensing apparatus of FIG. 4.

In some cases, the amplifier 130 may be implemented as depicted in FIG. 5, and may include operational amplifiers 130a, 130b to buffer each input, and another op-amp 130c to produce a desired output. As illustrated in FIG. 5, the op-amp 130c along with resistors labeled $R_2$ and $R_3$ may amount to a differential amplifier circuit, with a gain=$R_3/R_2$, and differential input resistance=$2*R_2$. The two op-amps 130a, 130b may act as buffers, where Rgain positioned between op-amps 130a, 130b may increase the differential-mode gain for the buffer pair while leaving the common-mode gain equal to about 1. Illustratively, in the amplifier 130 shown in FIG. 5, $(V_{out}/(V_2-V_1))=(1+((2*R_1)/R_{gain}))*(R_3/R_2)$. Roffset1 131 and Roffset2 133 define a voltage divider that sets the offset of the amplifier 130.

Illustratively, the sensing apparatus 100 as depicted in FIG. 4, may allow for several possible sensor output variations depending on selected features. For example, the sensing apparatus 100 may provide an analog-only output 112 (e.g., an output signal with no digital signal conditioning), a digital output 162 when the apparatus includes A/D converter 160 (e.g., with or without digital signal conditioning 164), a conditioned digital output 121 when the apparatus includes A/D converter 160 and Signal Conditioning block 164, and/or any other suitable sensor output variations that may or may not depend on the makeup of the hardware of apparatus.

Figure 6:
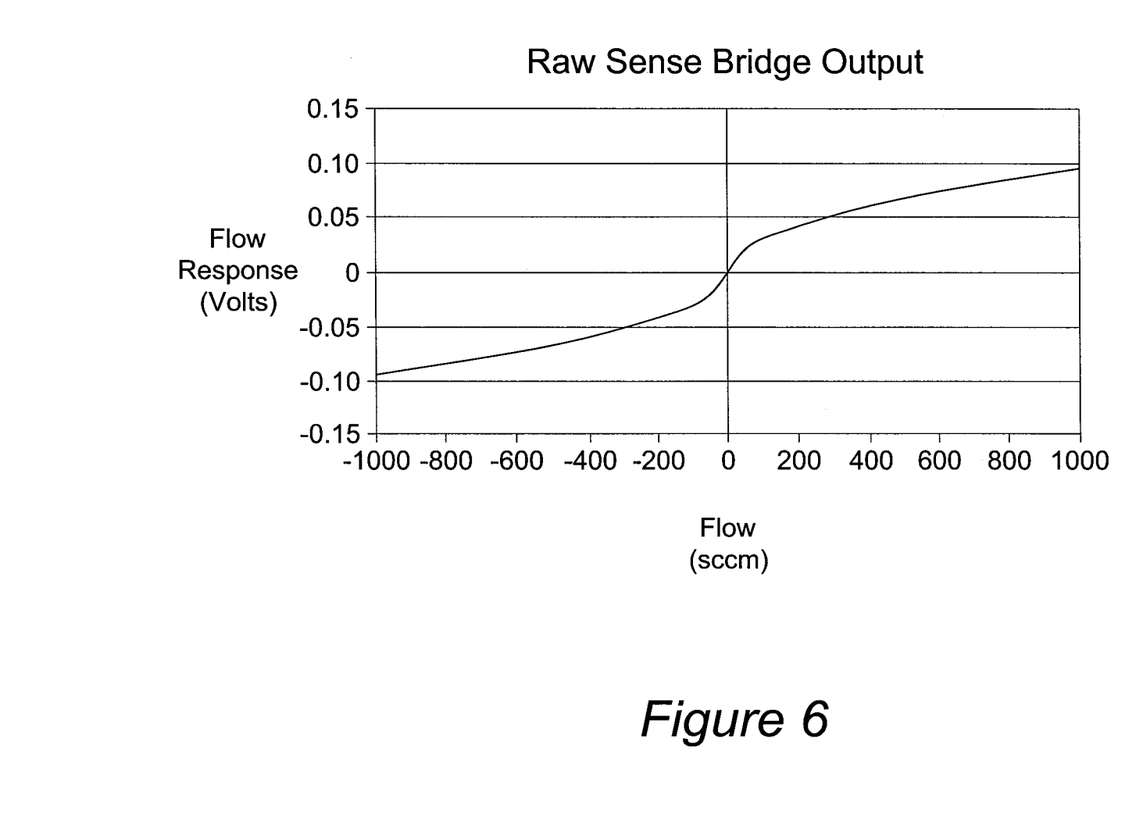
FIG. 6 is a chart showing a measured raw sense bridge output in volts over a flow range of −1000 sccm to 1000 sccm for an illustrative flow sensor.
Figure 7:
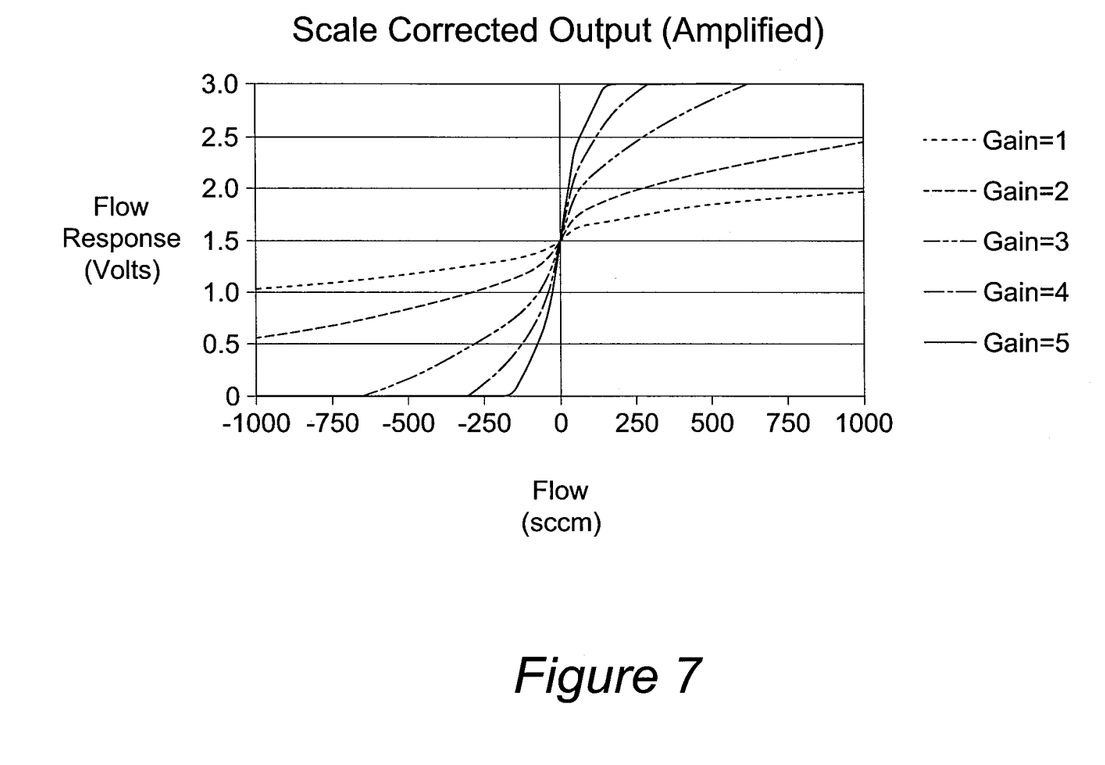
FIG. 7 is a chart showing a scale corrected output in volts over a flow range of −1000 sccm to 1000 sccm of the measured raw sense bridge output of FIG. 9 for different gains.
Figure 8:
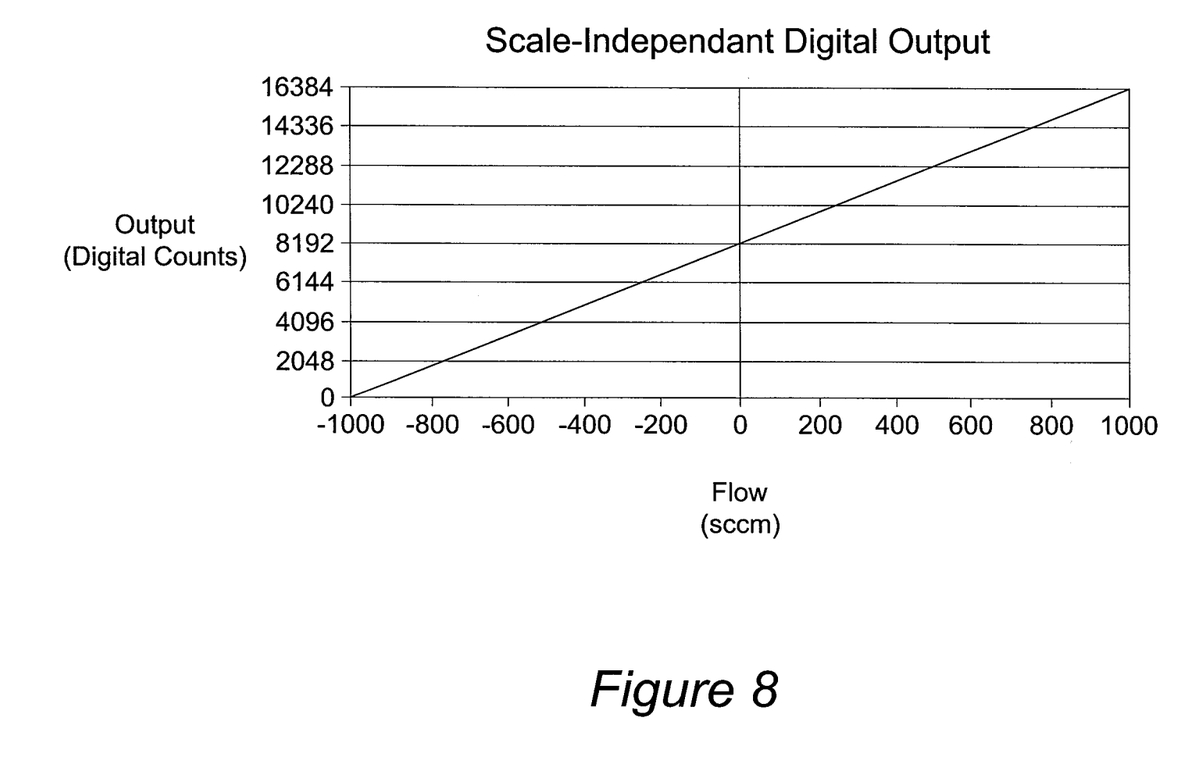
FIG. 8 is a chart showing a scale-independent digital output in digital counts over a flow range of −1000 sccm to 1000 sccm of the scale corrected output of FIG. 7.

FIG. 6 is a chart showing a measured raw sense bridge output 112 in volts over a flow range of −1000 sccm (standard cubic centimeters per minute) to 1000 sccm for an illustrative sensing apparatus 100. FIG. 7 shows the same curve, but amplified by amplifier 130 having a manual or automatic user adjusted gain feature used to modify the resolution of the analog sensor output signal 112, where each curve refers to a different gain value equal to a gain of 1, a gain of 2, a gain of 3, a gain of 4, and a gain of 5. In some cases, when amplification is applied to the amplified analog output signal 112 by amplifier 130, the A/D Conversion block 115 (when provided) may be configured to automatically calibrate, with digital math or any other technique, the amplified output signal 112', but this is not required. Illustratively, the amplified output signal 112' may be modified and/or calibrated prior to being outputted from sensing apparatus 100 to provide the same range of digital output signal values, regardless of the user or manufacturer gain applied to the analog sensor output signal 112. For example, FIG. 8 depicts an illustrative compensated digital sensor output signal 121 in digital counts over the sensed flow rate range, where the sensor output signal 121 in digital count range may be the same regardless of the gain of the amplifier 30.

Figure 9:
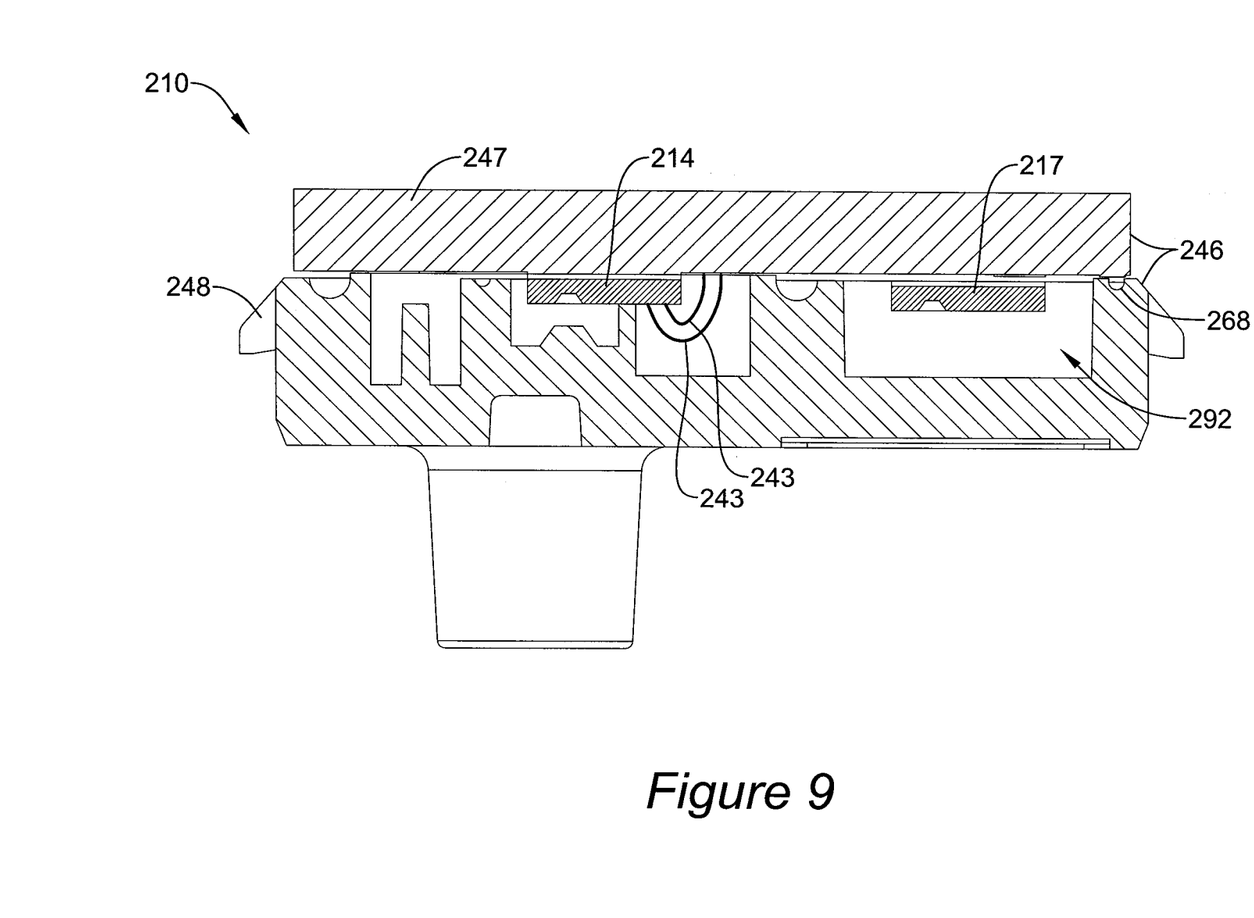
FIG. 9 is a schematic cross-sectional view of an illustrative sensing apparatus including a housing and a flow sense element.

FIG. 9 is a schematic cross-sectional view of an illustrative sensing apparatus 210 including a housing 246 and a flow sense element 214. The sensing apparatus 210 may be configured such that it may be retained within a single housing 246 or within multiple housings, as desired. In some instances, the housing 246 may include a body 248 and a cover 247 configured to be attached to the body 248 in any desirable manner. For example, the cover 247 may be affixed to the body 248 with an adhesive connection, snap connection, and/or with any other connection-type, as desired. The housing 246 may be made from any material, such as a metal, a plastic, an alloy, a polymer, any other similar or dissimilar material, and/or any combinations thereof. The housing 246 may be formed of any number of pieces of the same or different material. For example, the housing 246 may be made of a single piece of material, two pieces of material that are configured to engage one another, as shown in FIG. 9, or any other number of pieces of material.

In some instances, the housing 246 may support a sense element 214. The sense element 214 may include a chip or die 245 affixed to the body 248 and/or the cover 247. In some cases, an amplifier, such as amplifier 130, may be provided on sense element 214, or on a separate chip or die 217, as shown in FIG. 14. In some cases, an A/D Conversion block 115 may be provided on sense element 214, or on a separate chip or die 217, as desired. In some instances, the separate chip or die 217 may be in a separate cavity within the housing 246 from the sense element 214.

Having thus described various illustrative embodiments of the present disclosure, those of skill in the art will readily appreciate that yet other embodiments may be made and used within the scope of the claims hereto attached. Changes may be made in details, particularly in matters of shape, size, and arrangement of parts without exceeding the scope of the disclosure. The disclosure's scope is, of course, defined in the language in which the appended claims are expressed.

What is claimed is:

1. A sensor assembly for sensing a sensed parameter, the sensor assembly comprising:
   a sense element for sensing the sensed parameter, the sense element providing a sense element output signal that is related to the sensed parameter;
   a control block, including:
      a first input port for receiving the sense element output signal;
      a second input port for receiving a scale input adjustable by a user;
      an output port for providing a sensor assembly output signal; and
      wherein the control block is configured to take in the sense element output signal via the first input port and produce the sensor assembly output signal at the output port, wherein the sensor assembly output signal at the output port is related to the sense element output signal and corresponds to a user selected range of the sensed parameter, wherein the user selected range is determined, at least in part, by the scale input received via the second input port.

2. The sensor assembly of claim 1, wherein the sense element is a flow sensor, and the sensed parameter is a flow rate.

3. The sensor assembly of claim 1, wherein the sense element is a pressure sensor, and the sensed parameter is a pressure.

4. The sensor assembly of claim 1, wherein the control block includes a memory for storing one or more calibration parameters, and wherein the control block uses a different sub-set of calibration parameters for a first scale input value than for a second scale input value.

5. The sensor assembly of claim 1, wherein the control block is configured to produce substantially the same sensor assembly output signal across different scale inputs.

6. The sensor assembly of claim 1, wherein the scale input is coupled to a potentiometer, and the user can adjust the scale input by adjusting the potentiometer.

7. The sensor assembly of claim 6, wherein the potentiometer can be adjusted manually by a user.

8. The sensor assembly of claim 6, wherein the potentiometer can be adjusted digitally by a user.

9. The sensor assembly of claim 1, wherein the scale input is coupled to one or more resistors, and the user can adjust the scale input by adjusting one or more of the resistors.

10. The sensor assembly of claim 1, wherein the control block includes an amplifier having a programmable gain and offset, and an A/D converter.

11. A flow sensor assembly, comprising:
   a housing;
   a flow sense element supported in the housing for sensing a flow rate;
   a control block supported in the housing, the control block operatively coupled to the flow sense element, the control block providing a flow sensor assembly output signal that is related to the flow rate sensed by the flow sense element, the control block adjusting a scale of the flow sensor assembly output signal to correspond to a user selected range of the sensed flow rate, wherein the user selected range is determined, at least in part, by a range input value that is user-adjustable.

12. The flow sensor assembly of claim 11, wherein the control block is configured to produce substantially the same flow sensor assembly output signal even at different range input values.

13. The flow sensor assembly of claim 11, wherein the range input value is adjustable manually by a user.

14. The flow sensor assembly of claim 11, wherein the range input value is adjustable digitally by a user.

15. The flow sensor assembly of claim 11, wherein the control block includes a memory for storing one or more calibration parameters, and wherein the control block uses a different sub-set of calibration parameters for a first range input value than for a second range input value.

16. The flow sensor assembly of claim 11, wherein the control block includes an amplifier having a programmable gain and offset, and a A/D converter.

* * * * *